United States Patent
Christophe et al.

(10) Patent No.: US 10,334,057 B2
(45) Date of Patent: Jun. 25, 2019

(54) PATTERN BASED OPTIMIZATION OF DIGITAL COMPONENT TRANSMISSION

(71) Applicant: Google Inc., Mountain View, CA (US)

(72) Inventors: Emmanuel Christophe, Mountain View, CA (US); Elad Ganmor, Mountain View, CA (US); Qiangfeng Peter Lau, Mountain View, CA (US)

(73) Assignee: Google LLC, Mountain View, CA (US)

( * ) Notice: Subject to any disclaimer, the term of this patent is extended or adjusted under 35 U.S.C. 154(b) by 140 days.

(21) Appl. No.: 15/394,894

(22) Filed: Dec. 30, 2016

(65) Prior Publication Data

US 2018/0191837 A1   Jul. 5, 2018

(51) Int. Cl.
   *H04L 29/08*   (2006.01)
(52) U.S. Cl.
   CPC ............ *H04L 67/146* (2013.01); *H04L 67/22* (2013.01); *H04L 67/306* (2013.01)
(58) Field of Classification Search
   CPC ...... H04L 67/146; H04L 67/22; H04L 67/306
   See application file for complete search history.

(56) References Cited

U.S. PATENT DOCUMENTS

| | | | |
|---|---|---|---|
| 6,752,317 B2 | 6/2004 | Dymetman et al. | |
| 7,809,752 B1 | 10/2010 | Kozyrczak et al. | |
| 7,984,000 B2 * | 7/2011 | Heath | G06F 17/30864 706/20 |
| 9,092,757 B2 * | 7/2015 | Antin | G06Q 10/10 |
| 9,753,922 B2 * | 9/2017 | Hausler | G06Q 30/02 |
| 2006/0286542 A1 * | 12/2006 | Stevens | G09B 19/18 434/365 |
| 2011/0208585 A1 * | 8/2011 | Daboll | G06Q 10/00 705/14.53 |
| 2011/0208735 A1 * | 8/2011 | Gao | G06F 17/30864 707/730 |
| 2013/0166619 A1 | 6/2013 | Thompson et al. | |
| 2014/0156747 A1 | 6/2014 | Schatz et al. | |
| 2015/0067061 A1 * | 3/2015 | Poston | H04L 67/36 709/204 |
| 2016/0072873 A1 | 3/2016 | Hu et al. | |
| 2016/0254970 A1 * | 9/2016 | Bartholomew | H04L 43/065 709/224 |

FOREIGN PATENT DOCUMENTS

WO   WO2011039551   4/2011

* cited by examiner

*Primary Examiner* — Patrice L Winder
(74) *Attorney, Agent, or Firm* — Fish & Richardson P.C.

(57) ABSTRACT

Methods, systems, and apparatus, including computer programs encoded on a computer storage medium, for optimizing digital component transmission. A data structure stores session data for a user session. An encoder accesses the session data, encodes at least a portion of the online activities by representing different online activities with different symbols, and generates an encoded session string that includes multiple different symbols representing an order of occurrence of the different online activities. One or more servers classify the user session to a positive session classification or a negative session classification based on a classification score for the encoded session string, aggregates the classification of the user session with other classifications of other user sessions that have a same session string as the encoded session string, and adjusts distribution of digital components to client devices based on the aggregated classifications.

20 Claims, 6 Drawing Sheets

PATTERN BASED OPTIMIZATION OF DIGITAL COMPONENT TRANSMISSION

BACKGROUND

The Internet facilitates the exchange of information between users across the globe. This exchange of information enables transmission of content to a variety of users. In some situations, content from multiple different providers can be integrated into a single electronic document to create a composite document. For example, a portion of the content included in the electronic document may be selected (or specified) by a publisher of the electronic document. A digital component (e.g., a different portion of content) can be provided by a third-party (e.g., an entity that is not a publisher of the electronic document), and integrated into the electronic document with the portion of content selected by the publisher. In some situations, the digital component is selected for integration with the electronic document after a user has already requested presentation of the electronic document. For example, machine executable instructions (e.g., a script) included in the electronic document can be executed by a client device when the electronic document is rendered at the client device, and the instructions can enable (e.g., program) the client device to contact one or more remote servers to obtain one or more digital components that will be integrated into the electronic document, for example at the client device.

SUMMARY

In general, one innovative aspect of the subject matter described in this specification can be embodied in systems that include a data structure storing session data for a user session that specifies online activities that were performed at a client device, including browsing activity and user interaction with one or more digital components that were presented at the client device; an encoder that accesses the session data encodes at least a portion of the online activities by representing different online activities with different symbols, and generates an encoded session string that includes multiple different symbols representing an order of occurrence of the different online activities; and one or more servers that perform operations including: classifying the user session to a positive session classification or a negative session classification based on a classification score for the encoded session string; aggregating the classification of the user session with other classifications of other user sessions that have a same session string as the encoded session string; and adjusting distribution of digital components to client devices based on the aggregated classifications, including reducing a frequency with which a given digital component is presented when the aggregated classification is a negative session classification. Other embodiments of this aspect include corresponding methods, apparatus, and computer programs, configured to perform the actions of the methods, encoded on computer storage devices. These and other embodiments can each optionally include one or more of the following features.

Adjusting distribution of digital components can include discontinuing an experiment option when the aggregated classification of user sessions that were included in the experiment option is a negative session classification.

The one or more servers can perform operations including receiving a request for a digital component that specifies a given search query; identifying a given digital component as eligible for distribution in response to the received request based on the given search query matching a distribution criterion for the given digital component; and obtaining a predicted classification of an expected user session that will result from distribution of the given digital component based on classifications of a set of user sessions that included distribution of the given digital component in response to the given search query. Adjusting distribution of the digital components can include reducing a likelihood that the given digital component will be distributed in response to the request when the predicted classification of the expected user session is a negative session classification.

The one or more servers perform can perform operations including generating, for each of a plurality of different session strings, a normalized pattern score that represents a level of satisfaction with presentation of a particular digital component in response to submission of a particular search query when a series of online activities represented by the session string occurs following presentation of the particular digital component in response to the particular search query, including: for a given session string that includes a symbol representing user interaction with the particular digital component: identifying how many instances of the given session string have been classified to the positive session classification; identifying how many instances of the given session string have been classified to the negative session classification; identifying how many total session strings have been classified to the positive session classification; identifying how many of the total session strings have been classified to the negative session classification; computing, as a total session string ratio, a ratio of how many of the total session strings have been classified to the positive session classification relative to how many of the total session strings have been classified to the negative session classification; computing, as a pattern ratio for the given session string, a ratio of how many of the given session strings have been classified to the positive session classification relative to how many of the given session strings have been classified to the negative session classification; computing, as a normalizer for the given session string, a ratio of the total session string ratio to the pattern ratio for the given session string; and computing the normalized pattern score for the given session string based on the normalizer for the given session string.

The one or more servers can perform operations including training the session classifier based on a sublinear contribution of data from pairs of digital components and search queries, wherein the sublinear contribution of a given query/digital component pair is determined based on a frequency of occurrence of the given query/digital component pair.

The one or more servers can perform operations including identifying a particular session string having a particular series of symbols; determining that a total number of session strings having the particular series of symbols is less than a specified number; in response to the determination that the total number of session strings having the particular series of symbols is less than the specified number: removing a symbol from one end of the particular session string to create a fallback session string; identifying other session strings having a same series of symbols as the fallback session string; and iteratively performing the removing and identifying until the total number of session strings having the fallback session string meets the specified number.

Removing a symbol from one end of the particular session string can include in a first iteration of the removing, removing a first symbol in the particular session string to create a first instance of the fallback session string; and in a second iteration of the removing, removing a last symbol in the fallback session string to create a second instance of the fallback session string.

In general, one innovative aspect of the subject matter described in this specification can be embodied in methods that include the actions of accessing, in a data structure, session data for a user session that specifies online activities that were performed at a client device, including browsing activity and user interaction with one or more digital components that were presented at the client device; encoding, by an encoder, at least a portion of the online activities, including representing different online activities with different symbols; generating, by the encoder, an encoded session string that includes multiple different symbols representing an order of occurrence of the different online activities; classifying, by one or more servers, the user session to a positive session classification or a negative session classification based on a classification score for the encoded session string; aggregating, by the one or more servers, the classification of the user session with other classifications of other user sessions that have a same session string as the encoded session string; and adjusting, by the one or more servers, distribution of digital components to client devices based on the aggregated classifications, including reducing a frequency with which a given digital component is presented when the aggregated classification is a negative session classification. Other embodiments of this aspect include corresponding systems, apparatus, and computer programs, configured to perform the actions of the methods, encoded on computer storage devices. These and other embodiments can each optionally include one or more of the following features.

Adjusting distribution of digital components can include discontinuing an experiment option when the aggregated classification of user sessions that were included in the experiment option is a negative session classification.

Methods can include the actions of receiving a request for a digital component that specifies a given search query; identifying a given digital component as eligible for distribution in response to the received request based on the given search query matching a distribution criterion for the given digital component; and obtaining a predicted classification of an expected user session that will result from distribution of the given digital component based on classifications of a set of user sessions that included distribution of the given digital component in response to the given search query. Adjusting distribution of the digital components can include reducing a likelihood that the given digital component will be distributed in response to the request when the predicted classification of the expected user session is a negative session classification.

Methods can include the actions of generating, for each of a plurality of different session strings, a normalized pattern score that represents a level of satisfaction with presentation of a particular digital component in response to submission of a particular search query when a series of online activities represented by the session string occurs following presentation of the particular digital component in response to the particular search query, including: for a given session string that includes a symbol representing user interaction with the particular digital component: identifying how many instances of the given session string have been classified to the positive session classification; identifying how many instances of the given session string have been classified to the negative session classification; identifying how many total session strings have been classified to the positive session classification; identifying how many of the total session strings have been classified to the negative session classification; computing, as a total session string ratio, a ratio of how many of the total session strings have been classified to the positive session classification relative to how many of the total session strings have been classified to the negative session classification; computing, as a pattern ratio for the given session string, a ratio of how many of the given session strings have been classified to the positive session classification relative to how many of the given session strings have been classified to the negative session classification; computing, as a normalizer for the given session string, a ratio of the total session string ratio to the pattern ratio for the given session string; and computing the normalized pattern score for the given session string based on the normalizer for the given session string.

Methods can include the actions of training the session classifier based on a sublinear contribution of data from pairs of digital components and search queries, wherein the sublinear contribution of a given query/digital component pair is determined based on a frequency of occurrence of the given query/digital component pair.

Methods can include the actions of identifying a particular session string having a particular series of symbols; determining that a total number of session strings having the particular series of symbols is less than a specified number; in response to the determination that the total number of session strings having the particular series of symbols is less than the specified number: removing a symbol from one end of the particular session string to create a fallback session string; identifying other session strings having a same series of symbols as the fallback session string; and iteratively performing the removing and identifying until the total number of session strings having the fallback session string meets the specified number.

Removing a symbol from one end of the particular session string can include: in a first iteration of the removing, removing a first symbol in the particular session string to create a first instance of the fallback session string; and in a second iteration of the removing, removing a last symbol in the fallback session string to create a second instance of the fallback session string.

Particular embodiments of the subject matter described in this specification can be implemented so as to realize one or more of the following advantages. Evaluation and/or classification of online activities can be performed without using a click duration metric, thereby avoiding shortcomings of the click duration metric for various types of online activity. For example, some online activity, such as utilization of a click-to-call function (which initiates a phone call in response to user interaction with a digital component, such as an advertisement or entity contact information—e.g., presented on an electronic map interface) can generate two sequential interaction events (e.g., click events) within a very short period of time. In this example, the click duration metric would point to a negative user experience (e.g., because of the short click duration) irrespective of the actual user experience. Other types of user interactions are also susceptible to erroneous classification when click duration is used for purposes of classifying online activity. For example, downloads, video views, user swipes, and other online activities that can be invoked using digital components would each provide click durations that are disconnected from the actual user experience. For instance, a smaller file generally takes less time to download than a larger file (assuming similar connection bandwidth, etc.), but the download time is generally disconnected to the user experience. However, the click durations for these different downloads will differ based on the amount of time required to download the files, such that the download that takes longer would be considered to provide a better user experience than the download that took less amount of time. Similarly, the click duration can vary based on the task that is performed by the user. For example, a user that is checking the weather forecast on a page presented in response to interaction with a digital component will generally have a shorter click duration than a user that is filling out an online application to enroll in some program (e.g., membership application), such that the difference in click duration for these users may not be indicative of the quality of the different user experiences. The pattern based evaluation and optimization discussed in this document enables online activity to be classified independent of (or without using) the click duration metric, thereby enabling the pattern based evaluation and optimization to be used in situations where the click duration presents issues.

The discussion that follows also details several techniques that optimize standard model training techniques for purposes of training a pattern based online activity classification system. As discussed below, these techniques include online activity encoding (e.g., using simple symbols) to improve the ability to train a model based on patterns of user behavior, normalization techniques that normalizes a classification score for a particular pattern based on classifications of a corpus of patterns, a sublinear weighing technique that prevents the model training to be dominated by high frequency query/digital component pairs, thereby making the trained model more accurate across a collection of query/digital component pairs, and a fallback pattern generation technique, which ensures that the patterns for which the model is trained have a statistically significant amount of data and provide sufficient coverage of query/digital component pairs.

In addition to improving the quality of the model trained, these techniques also reduce the amount of data required to be evaluated, for example, by only training the model on patterns that provide a combination of sufficient coverage and accuracy. Also, the techniques discussed throughout this document are performed using millions upon millions of data points that require the use of a computer system to analyze and evaluate in order to create a predictive model. Furthermore, the model can be applied to real-time online traffic (e.g., to predict an outcome that will result from transmitting a particular digital component at a particular time), and the result of this real-time application can be transmission of a digital component to a client device. This real-time application generally requires decisions to be made in less than a second and within a computing system, such that the use of the computing system is required to carry out this real-time application.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Pattern based optimization of digital component transmission utilizes patterns of online activity to adjust how digital components are provided to client devices. In some implementations, the evaluation of the online activity requires that the online activities be encoded into a string of symbols that can be used to train a model (e.g., a predictive model or a model that provides post-hoc quality estimates). Note that much of the discussion that follows refers to predictive analysis, but that the techniques described below are also applicable to post-hoc determinations of quality.

There are various techniques discussed below that are used to optimize the training of the model, which utilizes a set of joined data from two or more different data sources. The set of joined data includes, for example, a first set of data (e.g., online activity dataset) specifies various online activities that were performed during sessions. These various online activities are generally indexed to a particular query/digital component pair. The particular query/digital component pair specifies a particular digital component (e.g., video, audio, image, text, or other content even in the form of search results or advertisements) that was transmitted to a client device in response to submission of a particular search query (or distribution keyword that was matched by the particular search query) from the client device. The other data set (e.g., session quality dataset) includes quality ratings that specify a level of quality associated with a given digital component that was provided in response to a given query.

As described in detail below, the model generated using the joined dataset enables classification of a given session as a positive session or a negative session based on the query/digital component pair and the pattern of online activity that occurred during the user session. The classifications of the model can be used for various purposes, such as determining whether to implement or discontinue an experiment option, adjust distribution criterion of a digital component based on the classifications of sessions in which the digital component was transmitted to client device, determine whether a particular digital component should be transmitted to a client device in response to submission of a particular query by the client device, among other applications.

Figure 1:
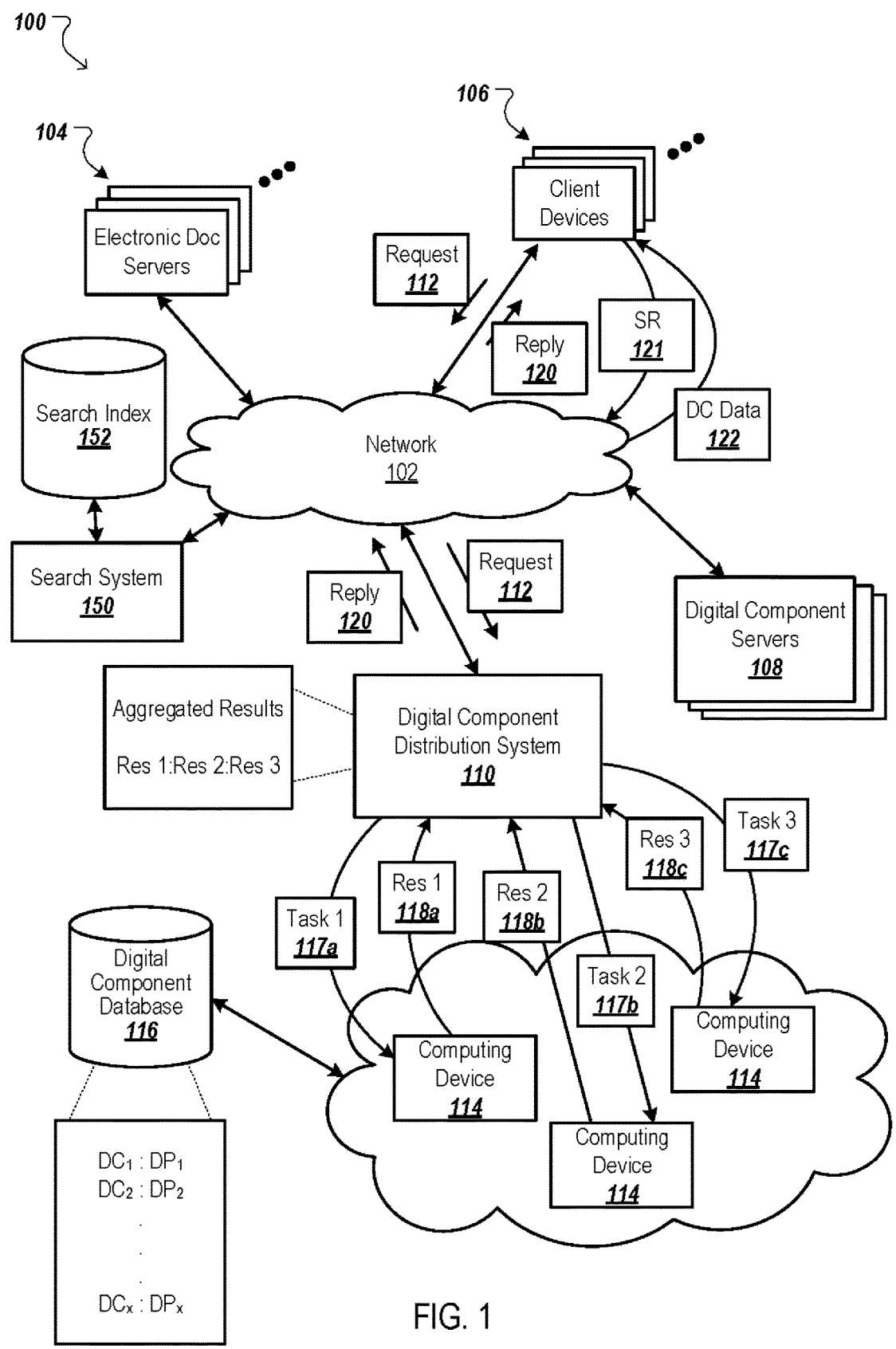
FIG. 1 is a block diagram of an example environment in which digital components are distributed for presentation with electronic documents.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, digital component servers 108, and a digital component distribution system 110 (also referred to as a component distribution system). The example environment 100 may include many different electronic document servers 104, client devices 106, and digital component servers 108.

A client device 106 is an electronic device that is capable of requesting and receiving resources over the network 102. Example client devices 106 include personal computers, mobile communication devices (e.g., smartphones), and other devices (e.g., tablet devices or wearable computing devices) that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include one or more digital component tags or digital component scripts that reference the digital component distribution system 110. In these situations, the digital component tags or digital component scripts are executed by the client device 106 when the given electronic document is processed by the client device 106. Execution of the digital component tags or digital component scripts configures the client device 106 to generate a request for one or more digital components 112 (referred to as a "component request"), which is transmitted over the network 102 to the digital component distribution system 110. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results. As used throughout this document, the term search query and query should be interpreted as covering queries beyond traditional search queries that are submitted through a traditional search engine. For example, these terms are intended to cover other types of queries, such as voice queries, voice commands, or voice instructions that are received by an artificial intelligence assistant, as well as other interactions with an artificial intelligence assistant.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a desktop device, a mobile device, or a tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110 chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device

106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the digital component distribution system 110 is implemented in a distributed computing system in order to process component requests and provide one or more digital components responsive to the request in the limited amount of time for doing so (e.g., in less than a second). The distributed computing system includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components (DC1-$x$). The millions of available digital components can be indexed, for example, in a digital component database 116. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, a search query, or terms specified in the component request 112) in order for the digital component to be eligible for presentation. In other words, the distribution parameters are used to trigger distribution (e.g., transmission) of the digital components over the network 102. The distribution parameters can also require that the component request 112 include information specifying a particular geographic region (e.g., country or state) and/or information specifying that the component request 112 originated at a particular type of client device (e.g., desktop device, mobile device, or tablet device) in order for the digital component to be eligible for presentation. The distribution parameters can also specify an eligibility value (e.g., ranking score, bid, or some other specified value) that is used for evaluating the eligibility of the digital component for distribution/transmission (e.g., among other available digital components), as discussed in more detail below. In some situations, the eligibility value can specify an amount that will be submitted when a specific event is attributed to the digital component (e.g., when an application is installed at a client device through interaction with the digital component or otherwise attributable to presentation of the digital component).

The identification of the eligible digital component can be segmented into multiple tasks 117a-117c (e.g., by the server) that are then assigned (e.g., by the server) among computing devices (e.g., 114, 114b, and 114c) within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request 112 and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the request 112. For example, the digital component distribution system 110 can select a set of winning digital components (one or more digital components) based on the outcome of one or more component evaluation processes, as discussed below. In turn, the digital component distribution system 110 can generate and transmit, over the network 102, reply data 120 (e.g., digital data representing a reply) that enables the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in a search results page. A search result is data generated by the search system 150 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. In some situations, the search system 150 can be part of, or interact with, an application store (or an online portal) from which applications can be downloaded for install at a client device 106 in order to present information about downloadable applications that are relevant to a submitted search query. Like other electronic documents, search results pages can include one or more slots in which digital components (e.g., advertisements, video clips, audio clips, images, or other digital components) can be presented.

Search queries that are submitted by client devices 106 can be used to identify one or more digital components that are presented with the search results page. For example, the digital component distribution system 110 can use the search query to identify digital components having distribution parameters that match (e.g., are the same as or otherwise match due at a specified level of similarity, such as qualifying under phrase matching or expanded matching, including plurals, stubs, synonyms, and other variants that are sufficiently similar to) the search query. The identification of the one or more digital components using the search query can be performed in a manner similar to that discussed above.

The determination of which digital component to provide can be informed by information about how distribution of various digital components will affect user satisfaction during a current user session. For example, when distribution of a given digital component is expected to lead to a positive user experience (e.g., by providing information that is relevant and timely presented at the client device) the likelihood that the given digital component will be provided can be increased relative to the likelihood that another digital component that is not expected to lead to a positive user experience.

Predicting whether a given digital component will lead to a positive user experience or a negative user experience is difficult to ascertain. Generally, the prediction is made based on an analysis of historical data. For example, if previous presentations of a given digital component in a particular context generally led to a positive user experience, it is likely that the given digital component will again lead to a positive user experience in that particular context. However, because of changes to the ways that users interact with online content and changes to the devices that are being used to facilitate the interaction with the online content, previously used indicators of positive user experiences may not provide an accurate view of whether presentation of the given digital component led to a positive or negative user experience.

For example, one previously used indicator of positive/negative user experience is click duration. Click duration is a measure of how long a user remained on a page that is linked to (e.g., by way of an active hyperlink) by a digital component after the user interacted with (e.g., clicked) the digital component. For example, assume that a user interacts with a particular digital component, and is redirected to a web page that is linked to by the particular digital component. The click duration in this example can be a measure of time from the user interaction with the particular digital component until the user navigates away from the web page.

Generally, a longer click duration was considered an indicator of a positive user experience, while a shorter click curation was considered a negative user experience. However, the click duration may vary based on network connection speeds and user experience with the web page that is linked to by the digital component. For example, assume that one user interacts with the digital component, thereby requesting the web page, using a mobile device over a cellular network, and another user interacts with the digital component using a desktop computer on a high speed LAN, thereby requesting the same web page. In this example, it may take more time for the web page to load at the mobile device than it does for the web page to load at the desktop computer. As such, the click duration corresponding to the user interaction on the mobile device may be skewed relative to that corresponding to the desktop device because of the additional amount of time that it took for the web page to load on the mobile device.

In another example, assume that a first user is very familiar with the web page, quickly identifies the information that they were looking for, and navigates away from the web page (or closes their browser). Further assume that a second user is visiting the web page for the first time, and is not familiar with the web page. In this example, the second user's lack of familiarity with the web page can lead to a longer click duration than the click duration that is measured for the first user even if each of the users end up having a positive experience with the web page.

Different types of user interactions that are being enabled also reduce the effectiveness of using click duration as an indicator of a positive/negative user experience. Some of the interactions that users can perform include, downloads, telephone calls, and swipes. However, the manner in which these interactions are enabled can lead to very short click duration measurements even when the user has a positive experience. For example, when a phone call is initiated through user interaction with a digital component, the initiation of the phone call may invoke two different "click events" (e.g., a first click event representing the user interaction with the digital component, and a second click event that initiates the phone call). These two click events will generally be very close in time (e.g., within a second of each other), such that the click duration recorded for the user interaction with the digital component will be artificially short (e.g., the amount of time between the two click events). Similarly, swipe events (e.g., a user swiping their finger across a touch screen to change a view of content presented) may occur very close in time leading to artificially short click durations even when a user has a positive experience.

As discussed in more detail below, the digital component distribution system can use patterns of user interaction as an indication of whether a user experience was a positive experience or a negative experience. For example, the digital component distribution system can merge encoded session logs with evaluation data to generate a model that outputs a prediction as to whether a given pattern of user interactions is indicative of a positive user experience or a negative user experience.

Basing the prediction of whether a user experience was positive or negative on the pattern of user behavior allows the prediction to be made independent of the duration between user interactions (e.g., click duration), which can lead to a more robust prediction (e.g., relative to that provided using click duration). In some implementations, the pattern evaluation (e.g., model training) is done for each query/digital component pair (e.g., for each different digital component that is presented in response to each different search query), such that the quality of the user experience (e.g., how positive or negative the user experience) associated with each different pattern can vary on a per-query and per-digital component basis. More specifically, a given pattern of online activity may be identified as corresponding to a positive user experience when one particular digital component is presented in response to a specific search query, while that same pattern of online activity may be identified as corresponding to a negative user experience when a different digital component is presented in response to the same specific search query. Similar distinctions can be made across different search queries.

Generally, the model is trained by based on triplets of data that specify (i) the query/digital component pair that is being examined (e.g., the specific search query that was submitted and the particular digital component that was presented in response to the search query), (ii) the pattern of online activity that occurred prior to and/or after the presentation of the particular digital component, and (iii) a user experience label specifying whether that query/digital component pair is associated with a positive or negative user experience. The model training utilizes several techniques that improve the quality of the predictions provided by the model (e.g., relative to models trained without using these techniques).

For instance, data for each query/digital component pair used to training the model can be weighted so that the contribution of any query/digital component pair is sublinear relative to the frequency of occurrence of that query/digital component pair, thereby preventing frequently occurring query/digital component pairs from dominating the model training. For example, when a particular query/digital component pair has significantly more data (e.g., more user interactions with the digital component) than other query/digital component pairs, this particular query/digital component pair can dominate the training of the model, thereby taking over prediction of a given pattern. Using a sub-linear weighting helps prevent this particular query/digital component pair from dominating the model training. An example sub-linear weighting technique allows each instance of a query/digital component pair to contribute $f(n)/n$ to the model training instead of $1/n$ (where $f(n)$ is a function of n). In some implementations, $f(n)$ is set to the natural log of $(1+n)$ (e.g., $f(n)=\ln(1+n)$, however other functions, such as $f(n)=n^{0.5}$, $f(n)=n^{0.3}$, or other functions can be used. As such, the sublinear contribution of a given query/digital component pair is determined based on a function of the frequency of occurrence of the given query/digital component pair.

Additionally, the quality of the model can be improved when the user satisfaction attributed to a particular pattern is normalized using a positive user experience to negative user experience ratio (discussed in more detail below with reference to FIG. 4). Further, online interaction patterns on which the model is trained are selected in a fallback manner. For example, when the number of occurrences of a given online activity pattern of a certain length (e.g., a series of five online activities) is less than needed to accurately train the model, fallback patterns can be used instead. A fallback pattern is a shortened online interaction pattern that is created by pruning (e.g., removing) a symbol representing an online activity from one end (or both ends) of the pattern of symbols in a session string. When a fallback pattern is created, it can be grouped with other matching fallback patterns until the number of fallback patterns is sufficient to train the model using the fallback pattern (discussed further with reference to FIG. 5.

Figure 2A:
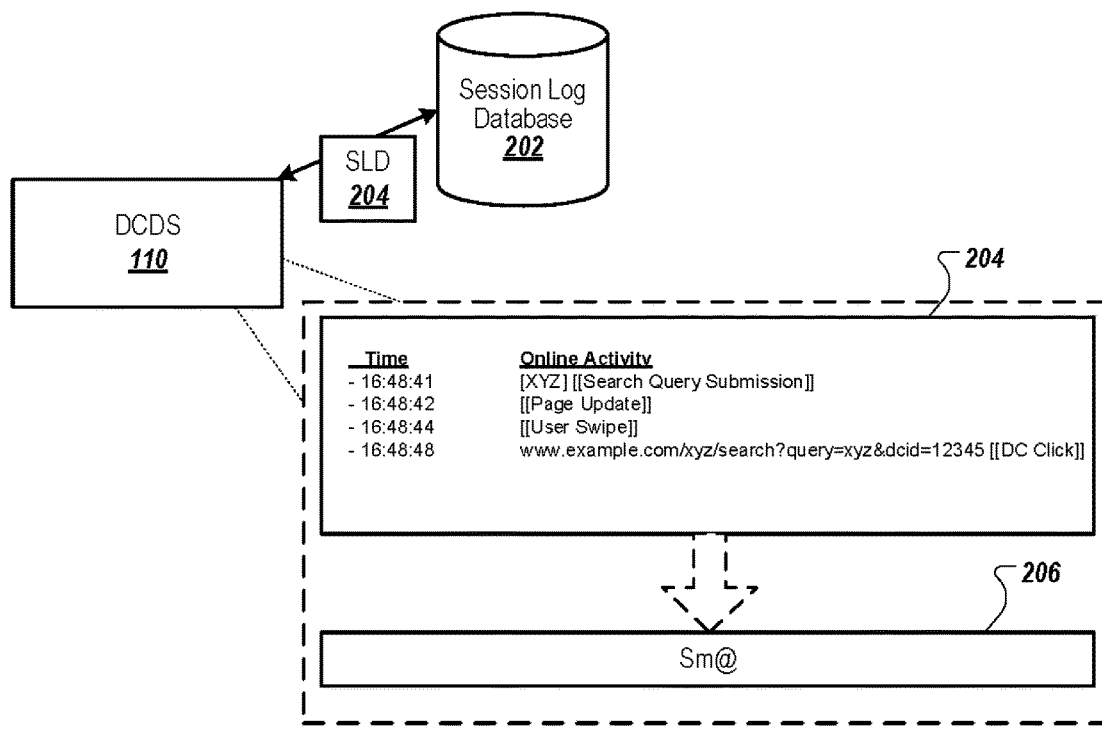
FIGS. 2A and 2B are block diagrams illustrating how sets of online activities are encoded to generate patterns of online activities.
Figure 2B:
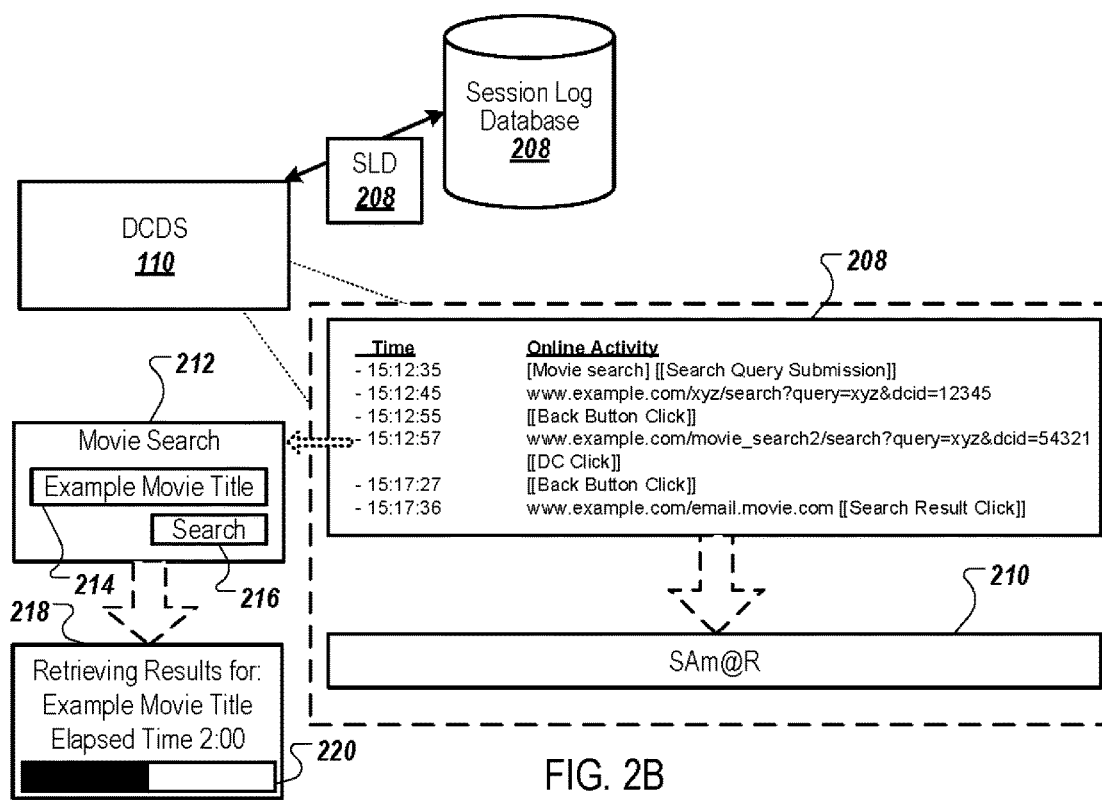

FIGS. 2A and 2B are block diagrams illustrating how sets of online activities are encoded to generate patterns of online activities. In some implementations, online activities are encoded using various symbols. For example, Table 1 (below) shows an example mapping of online activities to different symbols.

TABLE 1

| Online Activity | Related Task Symbol | Unrelated Task Symbol |
|---|---|---|
| Web Search (e.g., query submission) | S | s |
| Search Result Click | R | r |
| Digital Component Click (the digital component of the query/digital component pair being evaluated) | @ | |
| Digital Component Click (other than the digital component of the query/digital component pair being evaluated) | A | a |
| Image Search | I | i |
| Next Page | N | |
| Back Button Interaction (e.g., a click of a browser back button) | B | |
| Swipe or Scroll Interaction (e.g., a swipe gesture performed on a touch screen or scrolling a page) | H | |
| Page Zoom (e.g., increasing/decreasing the zoom level at which content is displayed) | Z | |
| Voice Search (e.g., submission of a query using voice commands) | V | v |
| Express positive user feedback (e.g., voice entry of feedback such as "cool," "awesome," etc.) | L | |
| Detection of Device Freefall (e.g., dropped) | T | |
| Express negative user feedback | X | |

Table 1 identifies various different online activities that can be detected, and the symbol (letter in this case) that is used to represent that online activity in an encoded session string (e.g., a pattern/series of symbols that represent online activities in a user session). As shown in Table 1, a distinction is made between online activities that are related to a given task and online activities that are not related to the given task. For example, when a web search is related to the given task, the online activity is represented using a capital "S." whereas when the web search is not related to the given task, the online activity is represented using a lower case "s." Note that all of the activities listed in Table 1 do not need to be tracked and/or encoded (and that other activities could be tracked and/or encoded), such that the encoding scheme used can be customized.

In some implementations, the given task is defined (or determined) based on the query for which the model is being trained (or used). For example, assume that the model is being trained (or used) with reference to the search query "local hotel." In this example, online activities related to the category "hotels," would generally be considered related tasks, while an activity such as a web search for a car insurance would generally be considered unrelated tasks. The level of relatedness required to be considered a related task or unrelated task can be varied based on design choices. Distinguishing between related and unrelated tasks enables these different tasks to be treated different. For example, a series of unrelated tasks that are in between related tasks can be ignored when evaluating a pattern of online activities or grouped together into a single symbol indicating that one or more unrelated tasks were performed between the related tasks.

As shown in FIG. 2A, the digital component distribution system ("DCDS") 110 accesses a session log database 202 to obtain a set of session log data ("SLD") 204. The session log database stores session log data for various user sessions. The session log data are the raw interaction data that are generated when a user is browsing the Internet. The session log data include information specifying resources (e.g., web sites) that were requested by a user device, and other detectable interactions. For example, the session log data can include entries specifying search queries that were received from a client device, digital components that were presented at the client device, interactions with the digital components, user interaction with the browser (e.g., clicking of a back button), and other online interactions (e.g., user swipes, hovers, etc.).

The digital component distribution system 110 parses the session log data to identify online activities that are to be encoded. For example, the digital component distribution system 110 can step through the session log data 204 line by line searching for one of the online activities included in Table 1. When the DCDS 110 identifies an online activity that matches one of the online activities in Table 1, DCDS can look up the symbol that is mapped to the identified online activity, and insert that symbol into an encoded session string for the user session. For instance, the session log data 204 specifies that the first online activity in the session was a search query submission of the query "XYZ" that occurred at 16:48:41. Upon identifying this online activity, the DCDS 110 can access an index that maps online activities to symbols and identify the symbol "S" as the symbol representing an online search. In turn, the DCDS 110 can insert the symbol "S" into an encoded session string for this online session. In this example, the search query submission is the first online activity in the session log data, such that the DCDS 110 can create the encoded session string with the symbol "S" being the first symbol in the string.

Continuing with this example, the DCDS 110 identifies the next online activity in the session log data 204 as a page update. However, page update is not one of the online activities identified in Table 1, so the DCDS 110 will not include a symbol for the page update in the encoded session string. The DCDS 110 continues to examine the next online activity in the session log data 204, which is a user swipe. In the present example, assume that an administrator of the DCDS 110 has elected to not encode the online activity of user swipe. As such, the DCDS 110 will not insert a symbol representing the user swipe into the encoded session string. The final online activity shown in the session log data 204 is a URL specifying a user interaction with, and specifically a click of, a digital component having the digital component identifier of 12345. The DCDS 110 again accesses a mapping of symbols to online activities and identifies the symbol @ as representing a click of a digital component, such that the symbol @ is inserted into the encoded session string. Appending the @ symbol to the previously identified S results in an encoded session string of S@, which represents the online activities performed during the user session.

In some implementations, the DCDS 110 distinguishes between the type of device that was used to perform the online activities, as users tend to perform different types of actions depending on the type of device (e.g., mobile, desktop, wearable, or tablet) that is being used. As such, the DCDS 110 can insert a symbol specifying the type of device that was used to perform the online activities. In some implementations, the device type symbol is inserted with the symbol representing the interaction with the digital component (e.g., @). For example, the symbol specifying a user interaction with a digital component from a mobile device can be m@, such that the final encoded session string in the example above can be Sm@, as shown in the box 206 of FIG. 2A. If the interaction with the digital component had been performed using a desktop device, the final encoded session string in the example above could have been Sd@, indicating with the symbol d that the user interaction was performed using a desktop device. In some implementations, separate models are generated for each different device type (or different groups of device types).

FIG. 2B illustrates the generation of another encoded session string 210. In this example, the DCDS 110 identifies the first online activity as the submission of the search query "movie search," and inserts the symbol S into the encoded session string 210 to represent this online activity. Next the DCDS 110 identifies an interaction (e.g., click) of the digital component having the identifier 12345 at the time of 15:12:45. Here, the same digital component having the identifier 12345 is again interacted with, but in this example the DCDS 110 encodes the interaction with the digital component 12345 with the symbol A, and inserts the A into the encoded session string following the S representing the search query submission. The difference in encoding of the digital component 12345 in this example (e.g., relative to the encoding used in the example of FIG. 2A) can occur when the session is being evaluated for a different query/digital component pair.

For example, with reference to FIG. 2A, assume that the query/digital component pair for which the session was being encoded was query=XYZ and DCID=12345 (e.g., for distribution of the digital component having the identifier 12345 when transmitted in response to the search query XYZ. As such, when the interaction with the digital component 12345 was identified in the example of FIG. 2A, the DCDS 110 encoded that interaction as m@ indicating that it was an interaction with the digital component from the query/digital component pair being evaluated. Meanwhile, assuming that the query/digital component pair being evaluated in FIG. 2B is query=XYZ and DCID=54321, the DCDS 110 encodes the interaction with the digital component 12345 as A instead of m@ because the digital component 12345 was interacted with, and is a related task (e.g., because it was distributed in response to the query that is part of the query/digital component pair), but is not the digital component in the query/digital component pair.

Continuing with this example, the DCDS 110 identifies the interaction with the browser back button, but for purposes of example, assume that the administrator of the DCDS 110 has chosen to not encode back button interactions. In this example, the DCDS 110 does not insert a symbol for this interaction into the encoded session string 210. The DCDS 110 next identifies the interaction with the digital component in the query/digital component pair (e.g., digital component having the identifier 54321) occurred at 15:12:57, and as such inserts the symbol m@ into the encoded session string 210 (e.g., after the A representing the prior digital component interaction). The DCDS 110 again identifies an interaction with the browser back button at 15:17:27, but does not insert a symbol for this interaction into the encoded session string 210, as discussed above. Rather, the DCDS 110 continues examining the session log data to identify the next online activity, which is a click on a search result at the time 15:17:27, and inserts the symbol R into the encoded session string to represent this interaction, thereby completing the encoded session string 210, which includes the pattern of symbols SAm@R.

In this example, the time between the interaction with the digital component 54321 and the back button click is more than four minutes (e.g., 15:17:27−15:12:57=4:30). Using the click duration metric, this interaction with the digital component 54321 would typically indicate a positive user experience because of the length of time that elapses until the next user interaction (e.g., the back button click). However, for purposes of this example, assume that the digital component 54321 is represented by the example digital component 212. This example digital component enables a user to initiate a movie search based on a movie title that is entered into a text box 214, by interacting with the search control 216. Upon interaction with the search control 216, the example digital component 212 can direct the user to the interface 218, which shows that the search for the input movie title is being performed, providing an amount of time that the search has taken (e.g., 2:00), and a progress bar 220, which shows that the search is approximately 50% complete. As can be appreciated, the amount of time that the user waits for the results of the movie search is not necessarily indicative of whether the interaction with the digital component 54321 was a positive or negative experience. However, the online activity surrounding the interaction with the digital component 54321 can be used to evaluate the user experience using the techniques described in this document.

Figure 3:
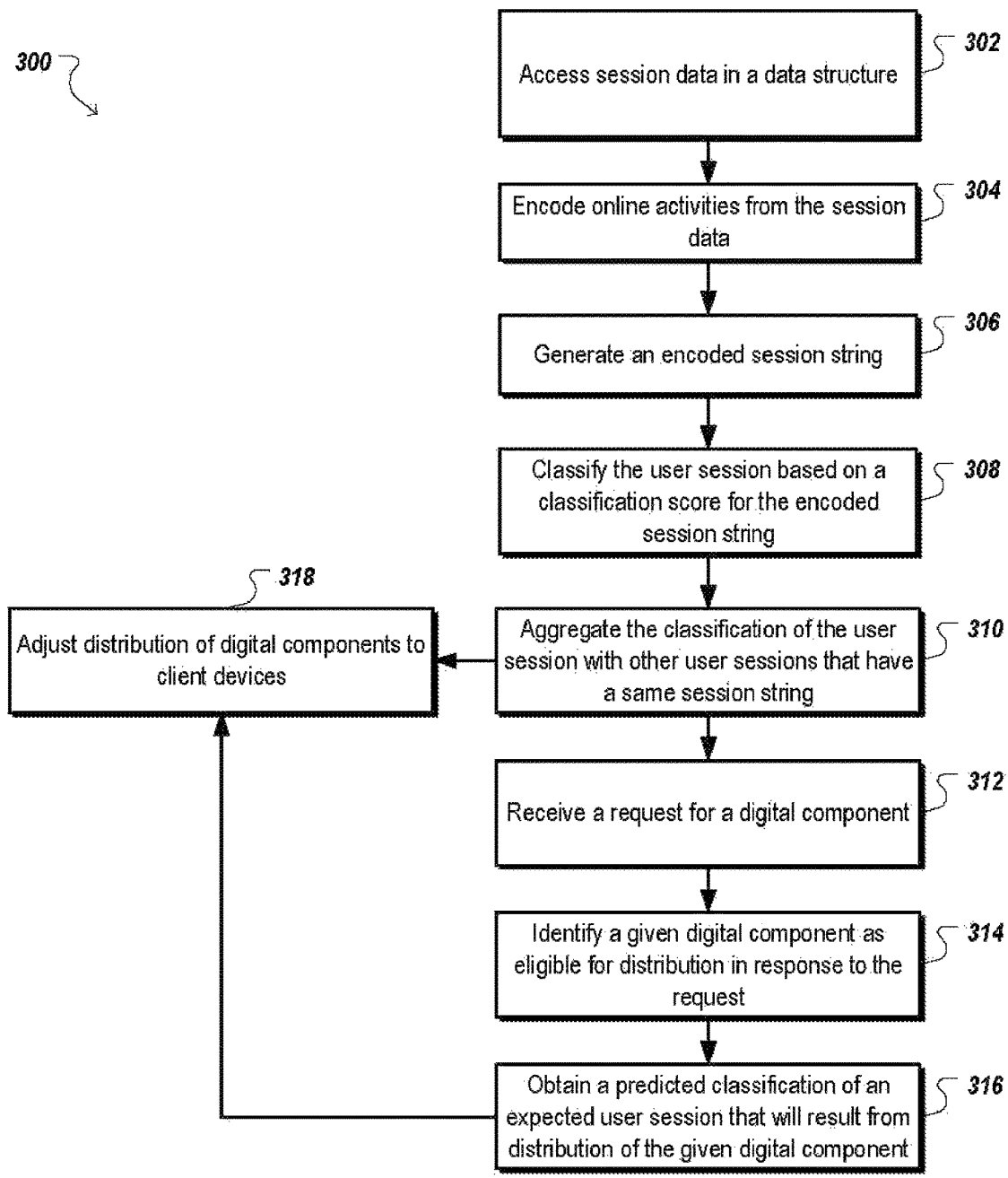
FIG. 3 is a flow chart of an example process for optimizing transmission of digital components based on pattern evaluation.

FIG. 3 is a flow chart of an example process 300 for optimizing (e.g., improving) transmission of digital components based on pattern evaluation. Operations of the process 300 can be performed, for example, by one or more servers (e.g., the DCDS 110 of FIG. 1). Operations of the process 300 can be implemented as instructions stored on a non-transitory computer readable medium. When executed the instructions cause one or more data processing apparatus to perform the instructions of the process 300.

Session data for a user session that specifies online activities that were performed at a client device are accessed in a data structure (302). The data structure can be an index stored in a data store, or another data structure (e.g., a log of interactions that occurred at the client device). The session data can include browsing activity and user interactions with one or more digital components that were presented at the client device. For example, the session data can specify digital components that were presented at the client device, mouse movement, mouse hovers, mouse clicks, taps or swipes on touch displays, and/or text or image input submitted through the client device.

The session data can be timestamped, thereby providing information about relative timing between the online activities that are logged. For example, as shown in FIGS. 2A and 2B, each instance of online activity is paired with a time at which the online activity occurred. One or more servers (e.g., of the DCDS 110) can use the time entries that are paired with two of the online activities to determine an amount of time between the activities. For example, the time between the activities can be computed as a mathematical difference between the two times that are paired with the two online activities.

As discussed above, the amount of time between online activities has been used as a measure of user satisfaction with the presentation of a digital component, with larger amounts of time between the online activities generally being considered more positive user experiences than lesser amounts of time between the online activities. However, due to the nature of some of the online activities that have been implemented, these times between online interactions (e.g., click duration) is less useful as a reliable indicator of positive or negative user experiences. In some implementations, a machine learning model can be generated using a joined dataset that includes patterns of online activity from one dataset and user satisfaction ratings that have been input with relation to the digital component presented to the user in response to a given query, which is obtained from another dataset. The machine learning model can be trained independent of the click durations, and can expressly exclude click duration from being used to train the model. In some implementations, an symbol representing a short click duration or long click duration could be used to include an indication of a short click duration or a long click duration in the session string. Encoding the click duration as an online activity in the session string with other encoded online activities would provide more contextual data regarding the user session than the click duration metric alone.

To format the session data as training data for the machine learning model, at least a portion of the online activities are encoded by an encoder. The encoder can be part of the DCDS 110 or implemented as a separate computing device that communicates with the DCDS 110 or otherwise makes encoded session data available to the DCDS 110. In some implementations, the encoder represents different online activities with different symbols. For example, as discussed above with reference to Table 1, each different online activity can be represented by a different symbol. Additionally, a given online activity can be represented by one symbol when the online activity is considered a related task activity, and can be represented by a different symbol when the online activity is considered an unrelated task activity, as discussed above.

An encoded session string that includes multiple different symbols is generated using the encoded session data (306). The encoded session string can be generated to represent an order of occurrence of the different online activities. For example, a first symbol in the encoded session string can be a first online activity that is being evaluated, with the second symbol (e.g., from the left) being a subsequent online activity that is being evaluated.

In some implementations, the online activity being evaluated can be limited, such that some online activities are not encoded or represented by symbols in the encoded session string. For example, assume that Table 1 includes all activities that are represented in the encoded session string. In this example, the encoder will not add a symbol to the encoded session string if it does not have a corresponding symbol in Table 1. In some implementations, multiple sequential occurrences of unrelated tasks can be grouped together and represented in the encoded session string by a single unrelated task symbol (e.g., "z"), rather than representing each of the sequential unrelated tasks with separate symbols.

The user session is classified based on as a classification score for the encoded session string (308). The user session can be classified to a positive session classification or a negative session classification depending on the classification score. In some implementations, the classification score can have a value in a range from 0-1.0 (or some other scale), and the user session is classified to the positive session classification when the classification score is 0.51-1.0, and classified to the negative session classification when the classification score is between 0.0-0.50. In some implementations, the user session is classified using a human provided classification score that is part of the user satisfaction ratings included in one of the datasets that are joined. For example, assume that the encoded session string represents a series of online activities performed by a given user, and that a human evaluator (e.g., the user that performed the series of online activities or a separate human evaluator) assigned the user session a classification score of 0.75. In this example, the user session is classified to the positive session classification (e.g., using a session classifier label) because the score of 0.75 is higher than 0.50.

In some implementations, the classification score can be specified for a given query/digital component pair that is presented during the user session. For example, the classification scores discussed above can specify the level of satisfaction with the digital component presented in response to submission of the query in the given query/digital component pair. More specifically, a human evaluator can submit the classification score based on an evaluation of a landing page for the digital component in the given query/digital component pair, thereby expressing a level of satisfaction of being directed to the landing page following submission of the query (and interaction with the digital component). These classification scores that are provided by human evaluators are stored in a database of classifications, and can be indexed to the query/digital component pair for which the classification was submitted. This database of classifications is joined with a separately stored session log, which enables the classification scores to be assigned to patterns of session strings. More specifically, one or more servers can scan the data in the stored session logs to identify online interactions that occurred during sessions associated with the query/digital component pair (e.g., sessions in which a particular query was submitted and a particular digital component was presented). Those online interactions are then encoded into session strings as discussed above, and the classification scores are assigned to those encoded session strings. For each different session string pattern, the ratings assigned to that pattern are aggregated (e.g., using the normalization and sub-linear weighting discussed in this document).

In some implementations, the classification of the user session can be performed based on an output of a session classifier that is applied to the encoded session string. The session classifier is trained based on a corpus of session strings for various user sessions and classification labels that are applied to each of the session strings in the corpus.

One or more servers (e.g., of the DCDS 110) can compare the pattern of symbols in the encoded session string to stored patterns of symbols for which a classification score has been learned. When the one or more servers identifies a matching pattern of symbols in the stored patterns, the one or more servers identifies (e.g., looks up) a classification score that has been learned for the stored pattern and/or indexed to the matching pattern in a data structure. The classification score that is returned can be assigned to the pattern as an indication of whether the pattern represents a positive user experience or a negative user experience. The learning of the classification score can utilize a normalization technique, as described in more detail with reference to FIG. 4.

The one or more servers (e.g., of the DCDS 110) aggregate the classification of the user session with other classifications of other user sessions that have a same session string as the encoded session string (310). The aggregation of the classifications can be performed, for example, by grouping classifications related to a same query/digital component pair. For example, each user session that includes presentation of a same digital component (or a digital component from a same source, e.g., advertiser) in response to a same search query can be evaluated to identify those user sessions that include the same session string as the encoded session string. The classifications of these identified user sessions can be aggregated to determine an overall classification of the encoded session string when the same digital component is presented in response to the same search query, which can be used as the predicted classification of a user experience that will result from presentation of that same digital component in response to a subsequent receipt of the same search query. Additionally, or alternatively, the data corresponding to these aggregated user session classifications can be used to train or update a predictive model that predicts the quality of a user experience that will result from presentation of the same digital component in response to receipt of the same search query.

A request for a digital component is received (312). The request can specify a given search query. For example, for purposes of example assume that the search query specified by the request is "XYZ." The search query specified in the request can be included in the request due to the search query having been submitted through a search interface that is presented at the client device.

A given digital component is identified as eligible for distribution in response to the received request (314). The digital component can be identified as eligible, for example, based on the given search query matching a distribution criterion for the given digital component. For example, one or more servers can compare the given search query to a set of distribution criteria that is stored in a data store that is accessible by the one or more servers. When the comparison reveals that the given search query matches one of the distribution criteria (e.g., a distribution keyword) of the given digital component, the one or more servers identify the given digital component as eligible for distribution (assuming all other required distribution criteria are also met).

A predicted classification of an expected user session that will result from distribution of the given digital component is obtained (316). The predicated classification can be based on classifications of a set of user sessions that included distribution of the given digital component in response to the given search query. For example, one or more servers can use one or more of the classifications of user sessions in which the given digital component was presented in response to the given search query for purposes of predicting a classification of the expected user session that will result from distribution of the given digital component. In some implementations, the predicted classification can be an average or weighted average of the classification scores for the various encoded session strings that have been evaluated for the query/digital component pair.

The predicted classification can be determined, for example, using string prediction model that predicts the likelihood of occurrence for one or more of the various encoded session strings, and use those likelihoods to weight the classification scores for the various encoded session strings. For example, the string prediction model can use event data received with the request (e.g., time of day information, geographic information, device type information, and other information) to predict how likely it is that the user will perform each pattern of interactions for which classifications (e.g., in the form of classification scores) have been learned, and use these likelihoods to weight the respective classifications that have been learned for the different patterns of interactions. In some implementations, the one or more servers can compute a weighted average of the classifications, and use that weighted average to determine whether distribution of the given digital component will result in a positive or negative user experience. For example, when the weighted average results in a classification score that is below 0.50 (e.g., on a scale of 0.0-1.0), then the prediction indicates that distribution of the digital component will lead to a negative user experience (e.g., classified to the negative session classification). Meanwhile, when the weighted average results in a classification score that is above 0.50, then the prediction indicates that distribution of the digital component will lead to a positive user experience (e.g., classified to the positive session classification). In some implementations, a weighted average of 0.50 can be treated as non-informative.

The one or more servers adjusts distribution of the digital components to client devices (318). In some implementations, the likelihood that the given digital component will be distributed in response to the request is reduced when the predicted classification of the expected user session is a negative session classification (e.g., a classification score of less than 0.50 on a scale of 0.0-1.0). Meanwhile, the likelihood that the given digital component will be distributed in response to the request can be increased (or not adjusted) when the predicted classification of the expected user session is a positive session classification (e.g., a classification score greater than 0.50 on a scale of 0-1.00). In some implementations, the distribution likelihood for the given digital component can be adjusted based on the value of the classification. For example, the reduction to the likelihood can be inversely proportional to classification scores that are less than 0.50. Meanwhile, increases to the likelihood can be proportional to classification scores that are greater than 0.50.

In some implementations, the one or more servers can adjust the distribution of digital components to client devices based on the aggregated classifications by reducing a frequency with which a given digital component is presented when the aggregated classification is a negative session classification (e.g., after step 310). For example, when the aggregated classification of the given digital component corresponds to the negative session classification, the given digital component can be prevented from distribution in response to the particular search query for which the classification was made. Alternatively, the eligibility value for the digital component can be reduced based on the negative session classification. For example, the reduction to the eligibility value can be inversely proportional to classification scores that are less than 0.50 (e.g., on a scale of 1.0). In some implementations, a classification score for a particular encoded session stream is determined based on normalized pattern score for a pattern of symbols that make up the encoded session stream, as discussed below with reference to FIG. 4.

The aggregated classifications can be used to determine whether an experiment option should be discontinued. Experiment options are different treatments that are applied to different user sessions. For example, when a new distribution criteria matching algorithm is being tested (e.g., an algorithm that determines which search queries match a particular distribution criterion), an experiment option would use the new algorithm on a portion of user sessions, while continuing to use the existing algorithm on other user sessions. In this example, patterns of online interactions can be collected and evaluated to determine whether each user session is classified to the positive session classification or the negative session classification. Those classifications can be aggregated for the user sessions in which the new algorithm was used, and evaluated to determine whether the aggregated classification corresponds to the positive session classification or the negative session classification. Additionally, or alternatively, the classifications (e.g., classification scores) of user sessions in which the existing algorithm was used can be aggregated, and compared to the aggregated classifications (e.g., classification scores) of the user sessions in which the new algorithm was used. When the comparison reveals that the aggregated classifications corresponding to the new algorithm are more negative than the aggregated classifications corresponding to the existing algorithm, the experiment option can be discontinued. Additionally, or alternatively, when the aggregated classifications of the experiment option (e.g., the new algorithm) result in a negative session classification for the experiment option, the experiment option may be discontinued independent of any comparison to other options.

Figure 4:
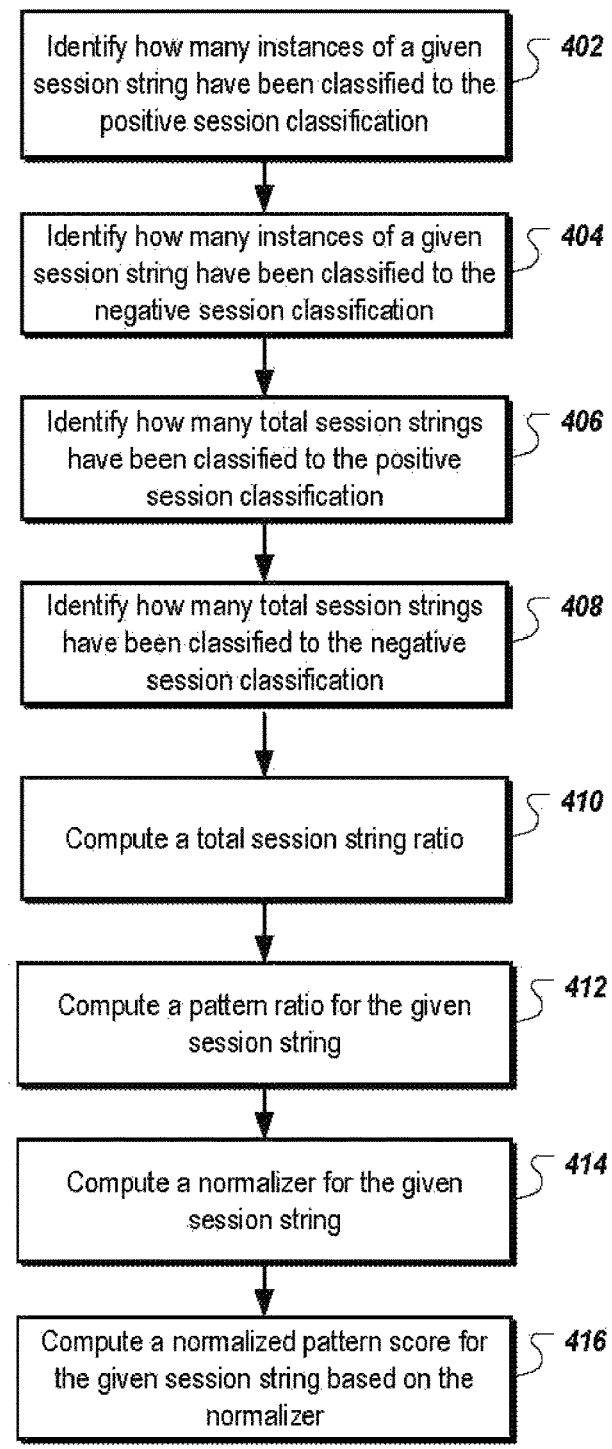
FIG. 4 is a flow chart of an example process for computing a normalized pattern score.

FIG. 4 is a flow chart of an example process 400 for computing a normalized pattern score. Operations of the process 400 can be performed, for example, by one or more servers (e.g., the DCDS 110 of FIG. 1). Operations of the process 400 can be implemented as instructions stored on a non-transitory computer readable medium. When executed the instructions cause one or more data processing apparatus to perform the instructions of the process 400. The process 400 generates (e.g., computes) a normalized pattern score for each of a plurality of different session strings. The normalized pattern score represents a level of satisfaction with presentation of a particular digital component in response to submission of a particular search query. The level of satisfaction with the presentation of the particular digital component is assigned to a series of online activities, as represented by the session string, that occur following presentation of the particular digital component in response to the particular search query. The operations discussed below can be performed for each different session string that are detected for a particular search query/digital component pair.

The one or more servers identify how many instances of a given session string have been classified to the positive session classification (402). In some implementations, the given session string includes a symbol representing user interaction with the particular digital component. The number of instances of the given session string that have been classified to the positive session classification can be identified, for example, by examining the classification score that was assigned to user sessions that include the given session string. For example, when the classification score for a particular session including the given session string is greater than a threshold (e.g., 0.5 on a scale of 1.0), the one or more servers can increment a counter that tracks how many instances of the pattern are classified to the positive session classification. The one or more servers can continue to inspect the classification scores of other user sessions that include the given session string, and increment the counter each time the classification score is above the threshold. The value of the counter provides the information as to how many instances of the given session string have been classified to the positive session classification.

The one or more servers identify how many instances of the given session string have been classified to the negative session classification (404). The number of instances of the given session string that have been classified to the negative session classification can be identified, for example, by examining the classification score that was assigned to user sessions that include the given session string. For example, when the classification score for a particular session including the given session string is less than the threshold (e.g., 0.5 on a scale of 1.0), the one or more servers can increment a counter that tracks how many instances of the pattern are classified to the negative session classification. The one or more servers can continue to inspect the classification scores of other user sessions that include the given session string, and increment the counter each time the classification score is below the threshold. The value of the counter provides the information as to how many instances of the given session string have been classified to the negative session classification.

The one or more servers identify how many total session strings have been classified to the positive session classification (406). The number of instances of total session strings (e.g., all logged session strings) that have been classified to the positive session classification can be identified, for example, by examining the classification score that was assigned to each user session irrespective of whether the user session includes the given session string. For example, when the classification score for a particular session is greater than the threshold (e.g., 0.50 on a scale of 1.0), the one or more servers can increment a counter that tracks how many of the user sessions are classified to the positive session classification. The one or more servers can continue to inspect the classification scores of other user sessions, and increment the counter each time the classification score is above the threshold. The value of the counter provides the information as to how many instances of the given session string have been classified to the positive session classification.

The one or more servers identify how many of the total session strings have been classified to the negative session classification (408). The number of instances of total session strings (e.g., all logged session strings) that have been classified to the negative session classification can be identified, for example, by examining the classification score that was assigned to each user session irrespective of whether the user session includes the given session string. For example, when the classification score for a particular session is less than the threshold (e.g., 0.50 on a scale of 1.0), the one or more servers can increment a counter that tracks how many of the user sessions are classified to the negative session classification. The one or more servers can continue to inspect the classification scores of other user sessions, and increment the counter each time the classification score is below the threshold. The value of the counter provides the information as to how many instances of the given session string have been classified to the negative session classification.

The one or more servers compute a total session string ratio (410). The total session ratio can be computed, for example, as a ratio of how many of the total session strings have been classified to the positive session classification relative to how many of the total session strings have been classified to the negative session classification (e.g., total session ratio=number of total session strings having the positive session classification/number of total sessions having the negative session classification). Relationship (1) can be used to determine the total session string ratio.

$$TSSR = \frac{G_T}{B_T} \quad (1)$$

where,

TSSR is the total session string ratio;

$G_T$ is a number representing how many total session strings have been classified to the positive session classification; and $B_T$ is a number representing how many total session strings have been classified to the negative session classification.

The one or more servers compute a pattern ratio for the given session string (412). The pattern ration can be computed, for example, as a ratio of how many of the given session strings having a same pattern have been classified to the positive session classification relative to how many of the given session strings having the same pattern have been classified to the negative session classification (e.g., pattern ratio=number of given session strings having the positive session classification/number of given session strings having the negative session classification). Relationship (2) can be used to determine the total session string ratio.

$$PR_i = \frac{G_i}{B_i} \quad (2)$$

where, $PR_i$ is the pattern ratio for a given session string having the pattern i;

$G_i$ is a number representing how many given session strings having the pattern i have been classified to the positive session classification; and $B_i$ is a number representing how many given session strings having the pattern i have been classified to the negative session classification.

The one or more servers compute a normalizer for the given session string (414). In some implementations, the normalizer is computed as a ratio of the total session string ratio to the pattern ratio for the given session string. For example, relationship (3) can be used to compute the normalizer.

$$N_i = \frac{TSSR}{PR_i} \quad (3)$$

where, $N_i$ is the normalizer for the given session string having the pattern i;

TSSR is the total session string ratio; and $PR_i$ is the pattern ratio for a given session string having the pattern i.

The one or more servers compute a normalized pattern score for the given session string based on the normalizer for the given session string (416). The normalized pattern score is a value that represents a level of user satisfaction attributed to a particular pattern of online activities (as represented by a particular pattern of symbols in a given session string). In some implementations, normalized pattern scores are determined on a per query/digital component pair, such that the same pattern can have a different normalized pattern score for each query/digital component pair. As such, the normalized pattern score that is determined for a particular query/digital component pair will provide a relative level of user satisfaction with a user session in which a particular digital component was provided in response to a particular search query. In some implementations, the normalized pattern score for a particular pattern can be determined for a particular query/digital component pair using relationship (4), relationship (5), relationship (6), or relationship (7).

$$NPS_i = \frac{1}{1 + N_i} \qquad (4)$$

where, $NPS_i$ is the normalized pattern score for the given session string having the pattern i; and $N_i$ is the normalizer for the given session string having the pattern i.

$$NPS_i = \frac{G_i}{G_i + B_i} \qquad (5)$$

where, $NPS_i$ is the normalized pattern score for the given session string having the pattern i;

$G_i$ is a number representing how many given session strings having the pattern i have been classified to the positive session classification; and $B_i$ is a number representing how many given session strings having the pattern i have been classified to the negative session classification.

$$NPS_i = \frac{G_i + 1}{G_i + B_i + 2} \text{ (using Laplace smoothing)} \qquad (6)$$

where, $NPS_i$ is the normalized pattern score for the given session string having the pattern i;

$G_i$ is a number representing how many given session strings having the pattern i have been classified to the positive session classification; and $B_i$ is a number representing how many given session strings having the pattern i have been classified to the negative session classification.

$$NPS_i = \frac{2}{\pi} a\tan\left(\frac{G_i}{G_i + B_i} * \frac{G_t + B_t}{G_t}\right) \qquad (7)$$

where, $NPS_i$ is the normalized pattern score for the given session string having the pattern i;

$G_i$ is a number representing how many given session strings having the pattern i have been classified to the positive session classification;

$B_i$ is a number representing how many given session strings having the pattern i have been classified to the negative session classification;

$G_T$ is a number representing how many total session strings have been classified to the positive session classification; and $B_T$ is a number representing how many total session strings have been classified to the negative session classification.

The normalized pattern score can be used to evaluate user satisfaction independent of click duration. For example, when a pattern of online activity is detected for a user session in which a given digital component was presented in response to a given search query, the pattern of online activity that occurred during the user session (e.g., as represented by symbols in an encoded session string) can be identified in a data structure that stores previously analyzed patterns of online activity and their respective normalized pattern scores. The one or more severs can read, from the data structure, the normalized pattern score corresponding to an entry in the data structure matching the pattern of online activity that occurred during the user session, and use that normalized pattern score as an indication of user satisfaction with the current user session.

For example, if the normalized pattern score is above 0.50 (e.g., on a scale of 0.0-1.0), the user session can be deemed a positive user experience. Meanwhile, the user session can be deemed a negative user experience when the normalized pattern score is less than 0.50. Alternatively, or additionally, the normalized pattern score can be used to predict user satisfaction with presentation of a given digital component in a given context (e.g., in response to submission of a particular search query), as discussed above. As such, the normalized pattern score can be used to adjust the distribution/transmission of digital components, as discussed above. Further, the use of the normalized pattern score as an indicator of user satisfaction enables evaluation of user satisfaction independent of click duration, which overcomes the problems associated with click duration discussion above and results in an optimized (e.g., improved) technique for transmitting digital components.

There are virtually an infinite number of patterns that could be evaluated using the techniques discussed above. For example, within each user session various different pattern lengths can be evaluated, which can exponentially increase the number of potential patterns to be considered. To reduce the computational load of evaluating a large number of patterns, and to ensure that a statistically relevant number of instances of a given pattern are available to generate a model, fallback patterns, which can also be referred to as fallback session strings, can be used to determine the patterns for which models should be built. As discussed above, a fallback pattern is a shortened online interaction pattern that is created by pruning (e.g., removing) a symbol representing an online activity from one end (or both ends) of the pattern of symbols in a session string.

For purposes of example, assume that the session string includes the pattern of symbols SRSRm@RSSR. In this example, the session string specifies that the user interacted with (e.g., clicked) a digital component on their mobile device (e.g., as represented by the m@ symbols). The session string also specifies that prior to the interaction with the digital component, the user submitted a search query, clicked on a search result, submitted another search query, and clicked on another search result, as represented by the SRSR pattern that precedes the m@. The session string further specifies that after the interaction with the digital component, the user clicked on another search result (note that an interaction with a "back" button (e.g., after clicking on the digital component) is not represented in the session string), and then submitted two different search queries and clicked on another search result, as represented by the RSSR pattern that follows the m@. In the present example, a fallback session string for this session string can be created by removing either the first (e.g., left-most) S in the session string, the last (e.g., right-most) R in the session string, or both. The generation of a fallback session string is described in more detail with reference to FIG. 5.

Figure 5:
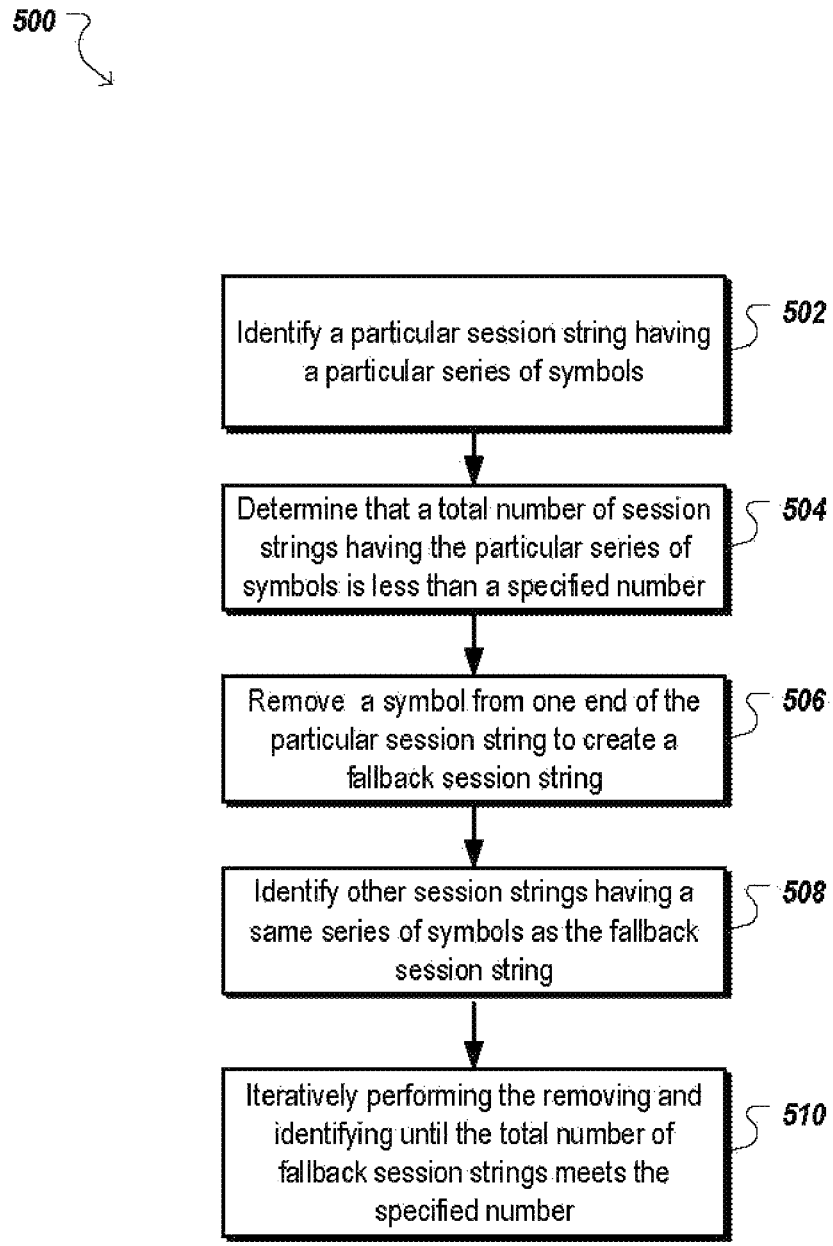
FIG. 5 is a flow chart of an example process for generating a fallback session string.

FIG. 5 is a flow chart of an example process 500 for generating a fallback session string. Operations of the process 500 can be performed, for example, by one or more servers (e.g., the DCDS 110 of FIG. 1). Operations of the process 500 can be implemented as instructions stored on a non-transitory computer readable medium. When executed the instructions cause one or more data processing apparatus to perform the instructions of the process 500.

The one or more servers identify a particular session string having a particular series of symbols (e.g., a particular pattern) (502). In some implementations, the one or more servers can access a data structure that stores a set of session strings (e.g., indexed by query/digital component pair), and select of the session strings to evaluate. For purposes of example, assume that the one or more servers select a session string including the pattern SRSRm@RSSR from the example above.

The one or more servers determine that a total number of session strings having the particular series of symbols is less than a specified number (504). In some implementations, the total number of session strings is determined on a per-query/digital component pair basis. For example, the one or more servers can search the data structure storing the session strings, and identify each session string that specifies a user interaction with a particular digital component (e.g., digital component A) that was provided in response to a particular search query (e.g., search query "XYZ"). These session string can be identified, for example, by searching the data structure for each session string that is indexed to (or otherwise stored in association with) the query/digital component pair (e.g., an index entry of digital_component=A: search_query=XYZ), and including each of the search strings indexed to this particular query/digital component pair as a member of the set of session strings that were collected for this particular query/digital component pair.

Once the set of session strings collected for this particular query/digital component pair have been identified, the total number of session strings in the set can be determined, for example, by counting (e.g., using a counter) the number of session strings in the set. The one or more servers then compare the determined number of session strings in the set to a specified number (e.g., a specified or threshold session string length) to determine whether a sufficient number of session strings are included in the set.

The specified number can be selected, for example, to balance coverage (e.g., a percentage of query/digital component pairs covered) with model accuracy. For example, the one or more servers (or an administrator) can evaluate the percentage coverage provided by different session string lengths, and select a session string length that provides at least the minimum level of acceptable coverage (e.g., 60%, 80%, or a different percentage) of all query/digital component pairs). The one or more servers can also examine the accuracy of models trained using the different session string lengths, and select a session string length that provides at least the minimum acceptable coverage, while also providing at least a minimum level of accuracy. The selected session string length can be set as the specified number to which the total number of session strings is compared. When the total number of session strings is less than the specified number, the one or more servers make the determination that the total number of session strings having the particular series of symbols is less than the specified number.

In response to the determination that the total number of session strings having the particular series of symbols is less than the specified number, the one or more servers can iteratively perform the following operations. The one or more servers remove a symbol from one end of the particular session string to create a fallback session string (506). As discussed above, given the particular session string SRSRm@RSSR, the one or more servers can remove either the leading S, the final R, or both of these symbols. In some implementations, the first symbol in the particular session string to create a first instance of the fallback session string. In this example, the one or more servers would remove the first S to create the fallback session string RSRm@RSSR, which omits the leading S from the original session string SRSRm@RSSR.

The one or more servers identify other session strings having a same series of symbols as the fallback session string (508). In a manner similar to that discussed above, the one or more servers can search the data structure (or the set of session strings that were included in the set of session strings having the SRSRm@RSSR pattern), to identify those sessions stings that include the fallback session string (e.g., RSRm@RSSR) to create a set of fallback session strings. The one or more servers can then determine whether the number of session strings in the set of fallback session strings meets (e.g., is equal to or greater than) the specified number (e.g., threshold number of session strings). When the number of session strings in the set of fallback session strings meets the specified number, the model can be trained using the session strings and the user satisfaction ratings corresponding to the user sessions that included the fallback pattern. In some implementations, the model is trained using only those user sessions that included the fallback pattern and were not covered by another pattern present in the model.

When the number of session strings in the set of fallback session strings does not meet the specified number, the one or more servers iteratively perform the removal of symbols and identification of session strings discussed above until the total number of session strings having the fallback session string meets the specified number (510). In some implementations, in a second iteration of creating a fallback session string, the one or more servers can remove a last symbol in the fallback session string to create a second instance of the fallback session string. Continuing with the example above, the one or more servers would remove the last R in the first fallback string RSRm@RSSR to create a second fallback strings of RSRm@RSS.

Figure 6:
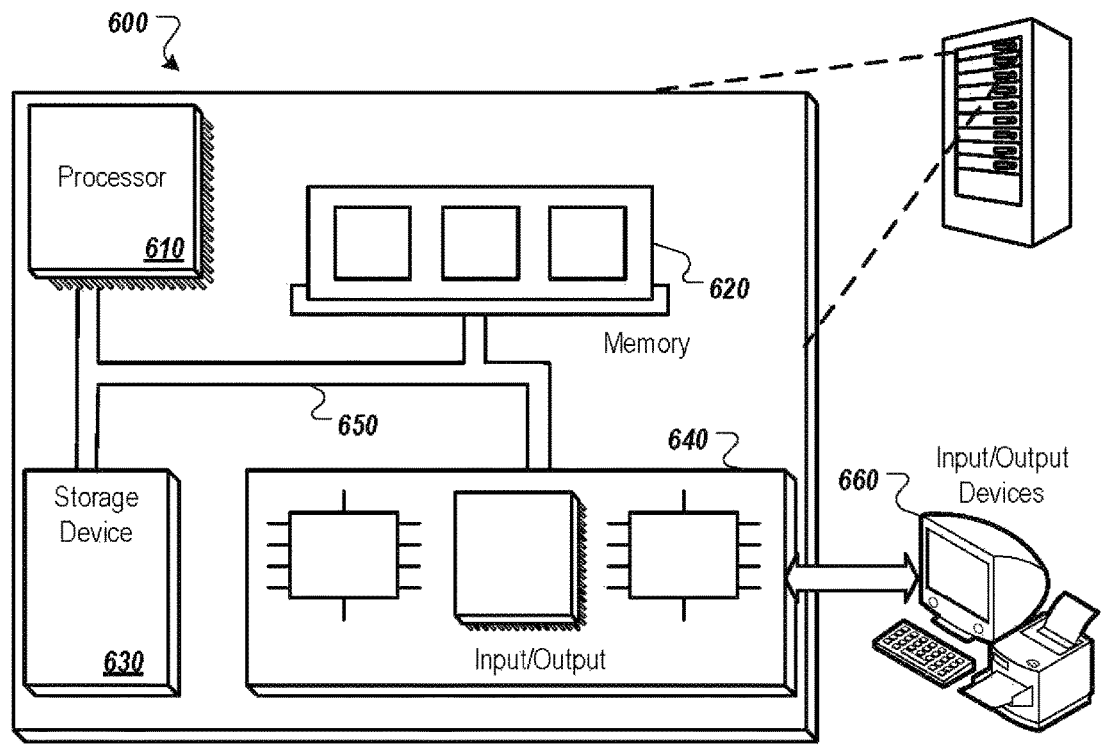
FIG. 6 is block diagram of an example computer system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data structure including one or more memory devices storing session data for a user session that specifies online activities that were performed at a client device, including browsing activity and user interaction with one or more digital components that were presented at the client device;
an encoder, including one or more processors, that accesses the session data performs operations including:
encoding at least a portion of the online activities that occurred following presentation of a given digital component by representing different sequential online activities with different symbols;
ignoring at least one online activity in the sequential online activities that has not been selected for encoding; and
generating an encoded session string that includes a sequential series of the different symbols representing an order of occurrence of the different sequential online activities; and
one or more servers, including one or more processors, that perform operations including:
classifying the user session to a positive session classification or a negative session classification based on a classification score for the encoded session string;
aggregating the classification of the user session with other classifications of other user sessions that have a same session string as the encoded session string for sequential online activities that occurred following presentation of the given digital component during the other user sessions; and
adjusting distribution of digital components to client devices based on the aggregated classifications, including reducing a frequency with which the given digital component is presented when the aggregated classification is a negative session classification.

2. The system of claim 1, wherein adjusting distribution of digital components comprises discontinuing an experiment option when the aggregated classification of user sessions that were included in the experiment option is a negative session classification.

3. The system of claim 1, wherein the one or more servers perform operations further comprising:
receiving a request for a digital component that specifies a given search query;
identifying a given digital component as eligible for distribution in response to the received request based on the given search query matching a distribution criterion for the given digital component; and obtaining a predicted classification of an expected user session that will result from distribution of the given digital component based on classifications of a set of user sessions that included distribution of the given digital component in response to the given search query, wherein:
adjusting distribution of the digital components includes reducing a likelihood that the given digital component will be distributed in response to the request when the predicted classification of the expected user session is a negative session classification.

4. The system of claim 1, wherein the one or more servers perform operations further comprising generating, for each of a plurality of different session strings, a normalized pattern score that represents a level of satisfaction with presentation of a particular digital component in response to submission of a particular search query when a series of online activities represented by the session string occurs following presentation of the particular digital component in response to the particular search query, including:
for a given session string that includes a symbol representing user interaction with the particular digital component:
identifying how many instances of the given session string have been classified to the positive session classification;
identifying how many instances of the given session string have been classified to the negative session classification;
identifying how many total session strings have been classified to the positive session classification;
identifying how many of the total session strings have been classified to the negative session classification;
computing, as a total session string ratio, a ratio of how many of the total session strings have been classified to the positive session classification relative to how many of the total session strings have been classified to the negative session classification;
computing, as a pattern ratio for the given session string, a ratio of how many of the given session strings have been classified to the positive session classification relative to how many of the given session strings have been classified to the negative session classification;
computing, as a normalizer for the given session string, a ratio of the total session string ratio to the pattern ratio for the given session string; and
computing the normalized pattern score for the given session string based on the normalizer for the given session string.

5. The system of claim 1, wherein the one or more servers perform operations further comprising training the session classifier based on a sublinear contribution of data from pairs of digital components and search queries, wherein the sublinear contribution of a given query/digital component pair is determined based on a frequency of occurrence of the given query/digital component pair.

6. The system of claim 1, wherein the one or more servers perform operations further comprising:
identifying a particular session string having a particular series of symbols;
determining that a total number of session strings having the particular series of symbols is less than a specified number;
in response to the determination that the total number of session strings having the particular series of symbols is less than the specified number:
removing a symbol from one end of the particular session string to create a fallback session string;
identifying other session strings having a same series of symbols as the fallback session string; and
iteratively performing the removing and identifying until the total number of session strings having the fallback session string meets the specified number.

7. The system of claim 6, wherein removing a symbol from one end of the particular session string comprises:
in a first iteration of the removing, removing a first symbol in the particular session string to create a first instance of the fallback session string; and
in a second iteration of the removing, removing a last symbol in the fallback session string to create a second instance of the fallback session string.

8. A method, comprising:
accessing, in a data structure including one or more memory devices, session data for a user session that specifies online activities that were performed at a client device, including browsing activity and user interaction with one or more digital components that were presented at the client device;
encoding, by an encoder including one or more processors, at least a portion of the online activities that occurred following presentation of a given digital component, including representing different sequential online activities with different symbols;
ignoring, by the encoder, at least one online activity in the sequential online activities that has not been selected for encoding;
generating, by the encoder, an encoded session string that includes a sequential series of the different symbols representing an order of occurrence of the different sequential online activities;
classifying, by one or more servers including one or more processors, the user session to a positive session classification or a negative session classification based on a classification score for the encoded session string;
aggregating, by the one or more servers, the classification of the user session with other classifications of other user sessions that have a same session string as the encoded session string for sequential online activities that occurred following presentation of the given digital component during the other user sessions; and
adjusting, by the one or more servers, distribution of digital components to client devices based on the aggregated classifications, including reducing a frequency with which the given digital component is presented when the aggregated classification is a negative session classification.

9. The method of claim 8, wherein adjusting distribution of digital components comprises discontinuing an experiment option when the aggregated classification of user sessions that were included in the experiment option is a negative session classification.

10. The method of claim 8, further comprising:
receiving a request for a digital component that specifies a given search query;
identifying a given digital component as eligible for distribution in response to the received request based on the given search query matching a distribution criterion for the given digital component; and
obtaining a predicted classification of an expected user session that will result from distribution of the given digital component based on classifications of a set of user sessions that included distribution of the given digital component in response to the given search query, wherein:

adjusting distribution of the digital components includes reducing a likelihood that the given digital component will be distributed in response to the request when the predicted classification of the expected user session is a negative session classification.

11. The method of claim 8, further comprising generating, for each of a plurality of different session strings, a normalized pattern score that represents a level of satisfaction with presentation of a particular digital component in response to submission of a particular search query when a series of online activities represented by the session string occurs following presentation of the particular digital component in response to the particular search query, including:

for a given session string that includes a symbol representing user interaction with the particular digital component:
identifying how many instances of the given session string have been classified to the positive session classification;
identifying how many instances of the given session string have been classified to the negative session classification;
identifying how many total session strings have been classified to the positive session classification;
identifying how many of the total session strings have been classified to the negative session classification;
computing, as a total session string ratio, a ratio of how many of the total session strings have been classified to the positive session classification relative to how many of the total session strings have been classified to the negative session classification;
computing, as a pattern ratio for the given session string, a ratio of how many of the given session strings have been classified to the positive session classification relative to how many of the given session strings have been classified to the negative session classification;
computing, as a normalizer for the given session string, a ratio of the total session string ratio to the pattern ratio for the given session string; and
computing the normalized pattern score for the given session string based on the normalizer for the given session string.

12. The method of claim 8, further comprising training the session classifier based on a sublinear contribution of data from pairs of digital components and search queries, wherein the sublinear contribution of a given query/digital component pair is determined based on a frequency of occurrence of the given query/digital component pair.

13. The method of claim 8, further comprising:
identifying a particular session string having a particular series of symbols;
determining that a total number of session strings having the particular series of symbols is less than a specified number;
in response to the determination that the total number of session strings having the particular series of symbols is less than the specified number:
removing a symbol from one end of the particular session string to create a fallback session string;
identifying other session strings having a same series of symbols as the fallback session string; and
iteratively performing the removing and identifying until the total number of session strings having the fallback session string meets the specified number.

14. The method of claim 13, wherein removing a symbol from one end of the particular session string comprises:
in a first iteration of the removing, removing a first symbol in the particular session string to create a first instance of the fallback session string; and
in a second iteration of the removing, removing a last symbol in the fallback session string to create a second instance of the fallback session string.

15. A non-transitory computer storage medium encoded with a computer program, the program comprising instructions that when executed by data processing apparatus cause the data processing apparatus to perform operations comprising:

accessing, in a data structure including one or more memory devices, session data for a user session that specifies online activities that were performed at a client device, including browsing activity and user interaction with one or more digital components that were presented at the client device;
encoding at least a portion of the online activities that occurred following presentation of a given digital component, including representing different sequential online activities with different symbols;
generating an encoded session string that includes a sequential series of the different symbols representing an order of occurrence of the different sequential online activities;
classifying the user session to a positive session classification or a negative session classification based on a classification score for the encoded session string;
aggregating the classification of the user session with other classifications of other user sessions that have a same session string as the encoded session string for sequential online activities that occurred following presentation of the given digital component during the other user sessions; and
adjusting distribution of digital components to client devices based on the aggregated classifications, including reducing a frequency with which the given digital component is presented when the aggregated classification is a negative session classification.

16. The computer storage medium of claim 15, wherein adjusting distribution of digital components comprises discontinuing an experiment option when the aggregated classification of user sessions that were included in the experiment option is a negative session classification.

17. The computer storage medium of claim 15, wherein the instructions cause the data processing apparatus to perform operations further comprising:
receiving a request for a digital component that specifies a given search query;
identifying a given digital component as eligible for distribution in response to the received request based on the given search query matching a distribution criterion for the given digital component; and
obtaining a predicted classification of an expected user session that will result from distribution of the given digital component based on classifications of a set of user sessions that included distribution of the given digital component in response to the given search query, wherein:
adjusting distribution of the digital components includes reducing a likelihood that the given digital component will be distributed in response to the request when the predicted classification of the expected user session is a negative session classification.

18. The computer storage medium of claim 15, wherein the instructions cause the data processing apparatus to perform operations further comprising generating, for each of a plurality of different session strings, a normalized pattern score that represents a level of satisfaction with presentation of a particular digital component in response to submission of a particular search query when a series of online activities represented by the session string occurs following presentation of the particular digital component in response to the particular search query, including:

for a given session string that includes a symbol representing user interaction with the particular digital component:
identifying how many instances of the given session string have been classified to the positive session classification;
identifying how many instances of the given session string have been classified to the negative session classification;
identifying how many total session strings have been classified to the positive session classification;
identifying how many of the total session strings have been classified to the negative session classification;
computing, as a total session string ratio, a ratio of how many of the total session strings have been classified to the positive session classification relative to how many of the total session strings have been classified to the negative session classification;
computing, as a pattern ratio for the given session string, a ratio of how many of the given session strings have been classified to the positive session classification relative to how many of the given session strings have been classified to the negative session classification;
computing, as a normalizer for the given session string, a ratio of the total session string ratio to the pattern ratio for the given session string; and
computing the normalized pattern score for the given session string based on the normalizer for the given session string.

19. The computer storage medium of claim 15, wherein the instructions cause the data processing apparatus to perform operations further comprising training the session classifier based on a sublinear contribution of data from pairs of digital components and search queries, wherein the sublinear contribution of a given query/digital component pair is determined based on a frequency of occurrence of the given query/digital component pair.

20. The computer storage medium of claim 15, wherein the instructions cause the data processing apparatus to perform operations further comprising:

identifying a particular session string having a particular series of symbols;
determining that a total number of session strings having the particular series of symbols is less than a specified number;
in response to the determination that the total number of session strings having the particular series of symbols is less than the specified number:
removing a symbol from one end of the particular session string to create a fallback session string;
identifying other session strings having a same series of symbols as the fallback session string; and
iteratively performing the removing and identifying until the total number of session strings having the fallback session string meets the specified number.

\* \* \* \* \*